(12) United States Patent
Lefley

(10) Patent No.: US 7,276,830 B2
(45) Date of Patent: Oct. 2, 2007

(54) FLUX IMPULSE MOTOR

(76) Inventor: Paul Lefley, 7 Grendon Close, Wigston, Leicestershire LE18 3WE (GB)

( * ) Notice: Subject to any disclaimer, the term of this patent is extended or adjusted under 35 U.S.C. 154(b) by 89 days.

(21) Appl. No.: 10/479,959

(22) PCT Filed: Jun. 11, 2002

(86) PCT No.: PCT/GB02/02442

§ 371 (c)(1),
(2), (4) Date: Jul. 19, 2004

(87) PCT Pub. No.: WO02/101907

PCT Pub. Date: Dec. 19, 2002

(65) Prior Publication Data

US 2004/0239209 A1    Dec. 2, 2004

(30) Foreign Application Priority Data

Jun. 11, 2001  (GB) ................... 0114142.3

(51) Int. Cl.
H02K 19/10   (2006.01)
H02K 1/10    (2006.01)

(52) U.S. Cl. .................. 310/166; 310/168; 310/184; 318/701

(58) Field of Classification Search ........... 310/162, 310/166, 167, 168, 216, 269, 184–186; 318/254, 318/701
See application file for complete search history.

(56) References Cited

U.S. PATENT DOCUMENTS 4,599,664 A    7/1986  Schuh ................... 360/97
5,117,144 A    5/1992  Török .................. 310/269
5,294,856 A *  3/1994  Horst .................. 310/181
5,717,316 A    2/1998  Kawai ................. 322/46
5,852,334 A * 12/1998  Pengov ................ 310/168

(Continued)

FOREIGN PATENT DOCUMENTS

DE        3506 151 A1    2/1985

(Continued)

OTHER PUBLICATIONS

R.P. Doedhar, et al. "The Flux-Reversal Machine: A New Brushless Doubly-Salient Permanent Magnet Machine" IEEE 1996, Speed Laboratory, University of Glasgow, Scotland, UK Industrial Electrical Engineering and Automation, Lund Institute of Technology, Sweden University Politehnica 1990 Timisoara, Romania.

Primary Examiner—Karl Tamai
(74) Attorney, Agent, or Firm—Luedeka, Neely & Graham, PC

(57) ABSTRACT

A motor (1) has a stator (2) and a rotor (10) mounted for rotation in the stator. A commutating salient pole (11) of the stator as a winding (7), and a field-producing salient pole (12) has a winding (8). The rotor has at least two salient poles (10a, b). An outer back-iron (13) magnetically joins bases of said stator poles. An inner back-iron (14) extends from the field pole around the rotor to such an extent that a substantial amount of the magnetic field in the rotor between its poles is short-circuited by the inner back-iron, at least for a part of its rotation. An electrical circuit powers the windings to drivingly rotate the rotor.

13 Claims, 9 Drawing Sheets

U.S. PATENT DOCUMENTS 6,259,225 B1 * 7/2001 Matsumoto .................. 318/696
2004/0239209 A1 * 12/2004 Lefley ........................ 310/269

FOREIGN PATENT DOCUMENTS

| | | |
|---|---|---|
| DE | 40 03 455 A1 | 6/1990 |
| DE | 44 45 356 A1 | 12/1994 |
| EP | 0 108 732 | 12/1986 |
| EP | 0 455 578 A2 | 6/1991 |
| EP | 0 528 750 B1 | 2/1993 |
| WO | WO85/02951 | 7/1985 |

* cited by examiner

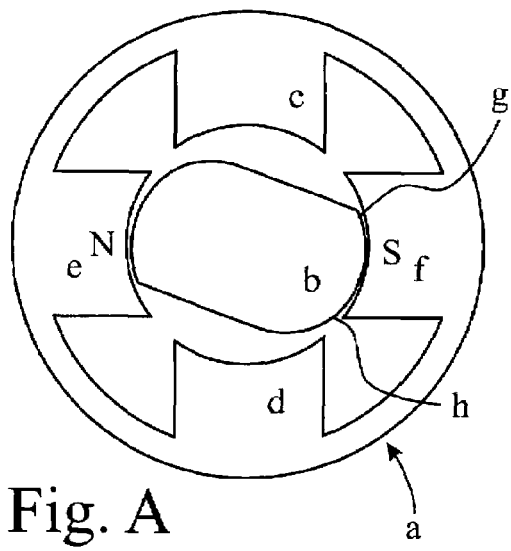
Fig. A
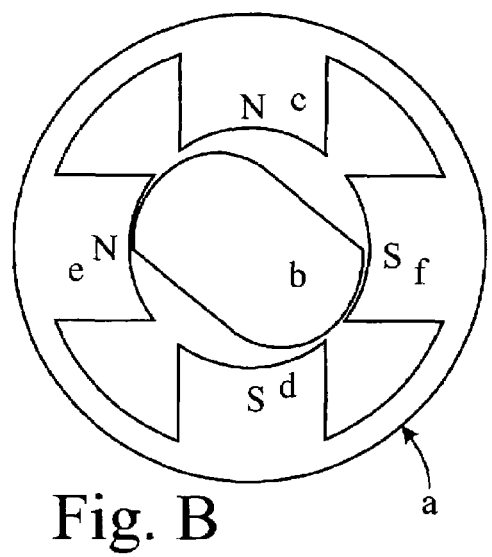
Fig. B
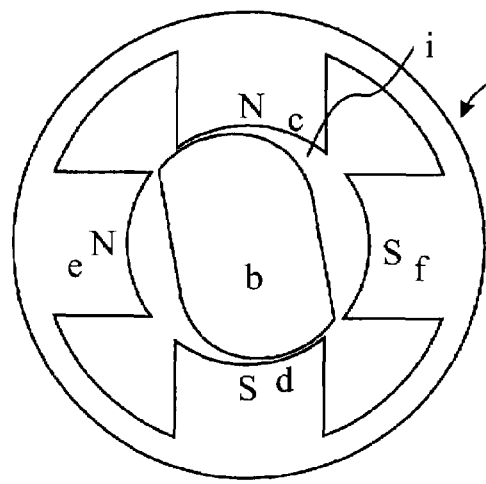
Fig. C
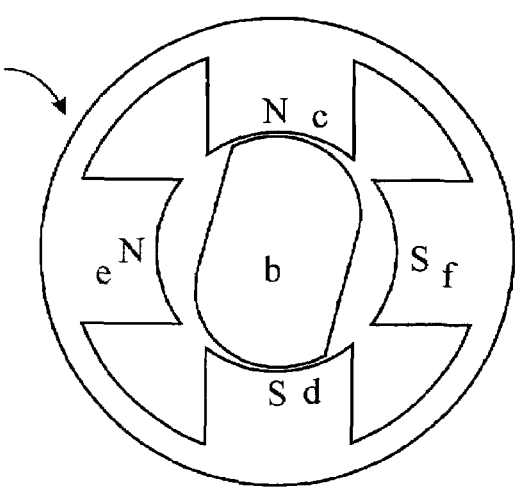
Fig. D
PRIOR ART

US 7,276,830 B2

FLUX IMPULSE MOTOR

FIELD OF THE INVENTION

The present invention relates to electric motors of the brushless type.

BACKGROUND OF THE INVENTION

Such motors comprise a stator and a rotor, the rotor rotating in the stator. The rotor is often, but not necessarily, magnetised. The stator usually comprises salient poles mounting windings forming part of an electrical circuit. By appropriate switching of the circuit the rotor can be driven to rotate at a speed determined by the circuit, usually in a synchronous manner.

There are numerous designs of motor and EP-A-0455578 discloses one arrangement. In this, a hybrid single phase variable reluctance motor is disclosed. Here, two commutating stator poles have two other poles between them, one carrying a permanent magnet to park the rotor in a position in which the motor will start when the commutating poles are energised, and the other carrying a position-sensing device. The arrangement is very simple and effective, with the circuit arrangements being easy to manufacture resulting in a low-cost motor suitable for applications such as driving fans.

However, in this simple mode, the torque produced is very pulsatile, leading to uneven operation.

SUMMARY OF THE INVENTION

It is an object of the present invention to provide a simple motor which not only parks the rotor in a startable position but which also provides a smooth operation.

In accordance with the present invention, there is provided a motor.

The motor includes a stator; a rotor mounted for rotation in the stator; first and second poles of the stator; a winding on at least one of the stator poles; at back-iron magnetically joining the stator poles; an inner back-iron, extending from at least one of the second stator poles around the rotor so that the magnetic field in the rotor between adjacent poles of the rotor is substantially short-circuited by the inner back-iron for a part of the rotation of the rotor; and an electrical circuit to power the winding to drivingly rotate the rotor.

The first pole of the stator is a commutating pole having the winding and never substantially short-circuiting the magnetic field through adjacent rotor poles. The second pole of the stator is a field connecting pole provided with the inner back iron. The rotor is magnetised so that adjacent ones of the rotor poles are oppositely magnetised.

The electrical circuit is provided with a controller to produce an alternating magnetic field in the commutating pole of the stator to attract each pole of the rotor as it approaches the commutating pole and to repel each pole of the rotor as it moves away from the commutating pole, the field alternating as many times per revolution of the rotor as there are poles of the rotor.

The rotor is driven by a combination of electromagnetic torque through interaction between the rotor and the commutating pole and reluctance torque through interaction between the rotor and the field-connecting pole.

When the rotor is cross-shaped with two pole pairs, the poles are alternately magnetised. Such an arrangement is preferable from a torque perspective but requires an electrical circuit having at least two switches in order to change the direction of magnetisation of the commutating pole (as many times per revolution as there are poles of the rotor).

BRIEF DESCRIPTION OF THE DRAWINGS

The invention is further described hereinafter, by way of example, with reference to the accompanying drawings in which.

FIGS. A to D are schematic diagrams of a known motor, not forming part of the present invention.

DETAILED DESCRIPTION

Figure 1A:
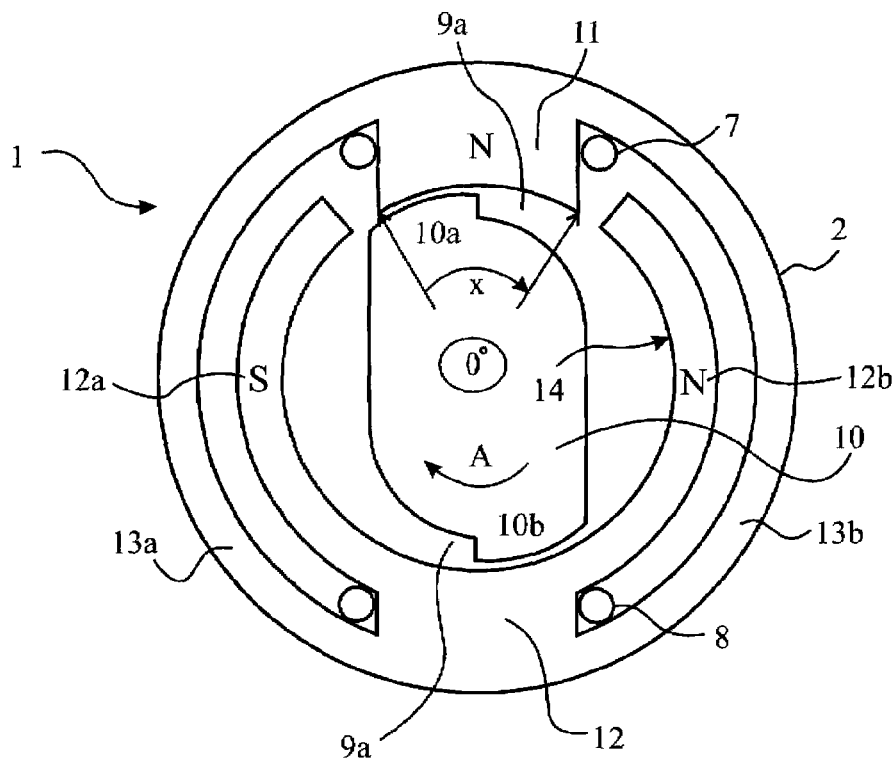
FIGS. 1a to d are schematic diagrams of a motor in having a two-pole rotor, in each drawing the rotor being in a different angular position.
Figure 1B:
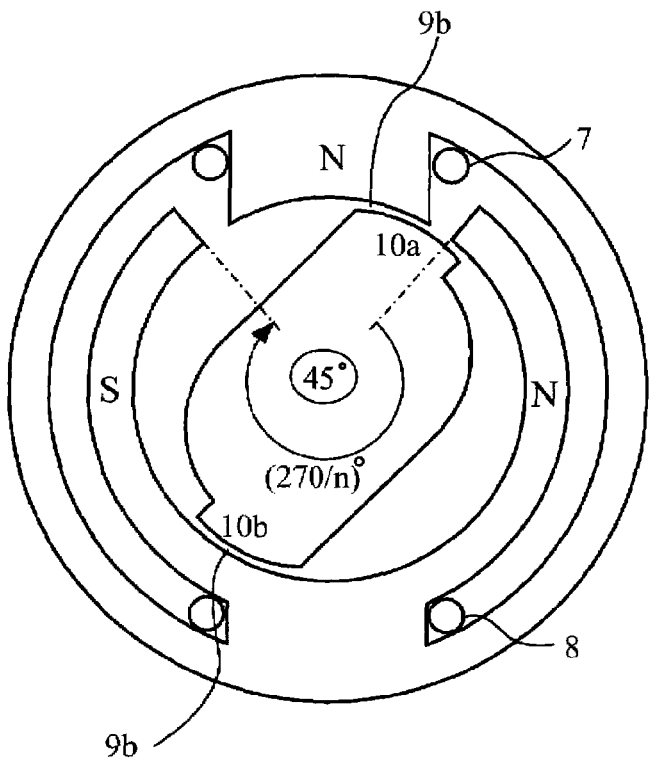

FIG. A shows a basic arrangement of a known two pole flux impulse motor a, comprising a two pole rotor b, a stator consisting of two commutating poles c and d, and two field poles e and f. The field poles may either be permanently magnetised with one possible arrangement (as shown) or there is a field winding (around the field poles) with a dc current flowing to produce the magnetisation shown. Coils (not shown) are wound around the commutating poles to form a winding called the commutating winding. The poles g of the rotor may not have a constant radius arc at the pole extremities. Instead, a tapering curved leading edge h of the poles is provided, such that the radial air gap i created between the poles of the rotor and any of the stator poles varies during rotation. There may also be other features of the rotor poles to enhance the asymmetry of the two rotor poles. For example, instead of the (preferred) infinitely varying gap i shown in FIGS. A to D, a step or shoulder may be formed at the pole tip.

In the absence of a current in the commutating winding the rotor is at a position of rest as shown in FIG. A. If a dc current is applied to the commutating winding a field is created on the commutating poles with a north pole on pole c and a south pole on pole d (see FIG. B). As a result of the field, the rotor b rotates from a position of rest to another position of equilibrium shown in FIG. B. If the magnitude of the current in the commutating winding is increased, then the rotor rotates further to another position of equilibrium, for example as shown in FIG. C. If the current in the commutating winding is now switched off, (and in the absence of any rotational inertia of the rotor in a clockwise sense), the rotor may rotate anticlockwise and settle in the initial position of equilibrium shown in FIG. A.

This demonstrates a possible starting problem with this type of motor. In order to ensure that the motor is able to start up from rest and accelerate, the magnitude of the magnetic field produced at the commutating poles has to be much greater than the permanent field produced by the field poles. To ensure a continuous rotation, the commutating poles must pull the rotor to the position shown in FIG. D. In this position, and upon releasing the current in the commutating winding, the field poles will pull the rotor clockwise to the position shown in FIG. A (completing a rotation of 180 degrees).

Clearly a large pulse of current is required to start the motor, or the magnitude of the permanent field needs to be weak, at least in order to avoid excessive currents. As soon as the rotor is rotating at some speed, large impulses of flux produced at the commutating poles pull the rotor from the field alignment flux. The inertia of the rotor (and some torque produced by the field alignment flux) carries the rotor to the next commutation position. Thus the current in the commutating winding is not continuous and has a duty of typically around 50%.

To ease the starting and running problems it may be advantageous to switch off the field at certain times. However, this means that permanent magnets may not be used to produce the field flux, and that there must be appropriately timed commutation of the field winding current, in addition to the commutating winding current. This adds extra complexity to thee design of the motor and the power electronics.

Turning to FIG. 1 to the drawings, a motor 1 comprises a stator 2 and a rotor 10 mounted for rotation within the stator 2.

The stator 2 has a commutating pole 11 and a field pole 12. The stems or bases of the commutating pole 11 and field pole 12 are joined by an outer back-iron 13a, b. The commutating pole 11 has a commutating winding 7 which is in series (or parallel) with a field winding 8 on the field pole 12. However, there may be some advantage in keeping the commutating pole coils 7 separate from the field connecting pole coils 8.

The angular extent x of the commutating pole 11 is about 90°. The rotor 10 has two salient poles 10a,b, the angular extent of which is likewise about 90°. Each pole is provided with a shoulder so as to provide an enlarged air gap 9a on the leading edge of the rotor, and a thin air gap 9b on the trailing edge of the rotor. This enlarged air gap 9a ensures rotation of the rotor 10 in the direction of the arrow A. It means that flux connection between the rotor occurs over only about half the angular extent of the rotor, ie about 45°. Although shown as a step, it is preferred that an arrangement similar to that shown in FIGS. A to D is employed which provides a smoother transition between flux connection and isolation. For convenience, however, a stepped shoulder is shown here, although and nothing at all is shown in FIGS. 3 to 5, and 9 and 10, below.

The field pole 12 is provided with two limbs 12a,b which, between them, define an inner back-iron 14. The angular extent of the inner back-iron is about 270°. As mentioned above, the poles 10a,b of the rotor (ie, those parts presenting the minimum air gap 9b with the stator poles) subtend an angle of about 45° each. Accordingly, as can be seen in FIGS. 1c and d, the angle α of rotation of the rotor over which both poles 10a,b of the rotor 10 lie adjacent the back-iron 14 (ie are short-circuited by it) is about 45°.

Figure 1C:
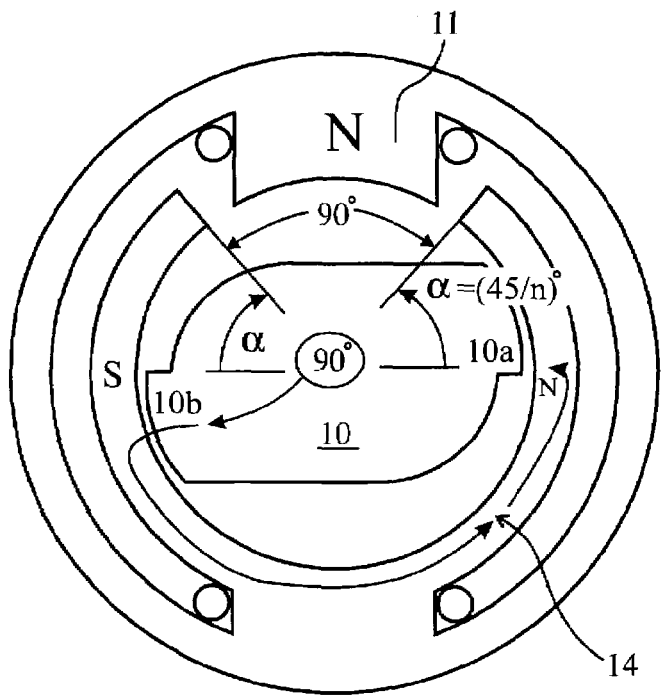
Figure 1D:
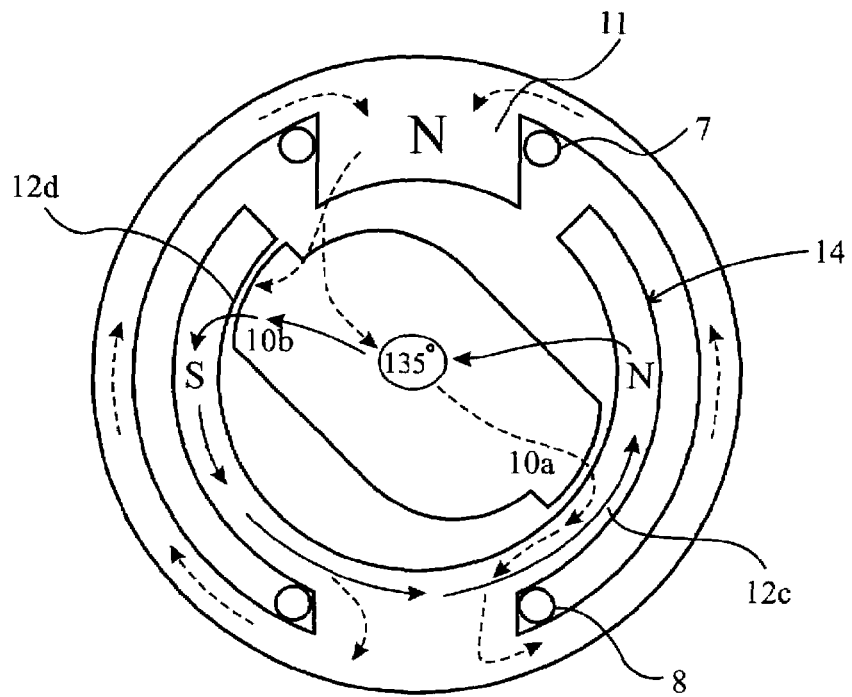
Figure 6A:
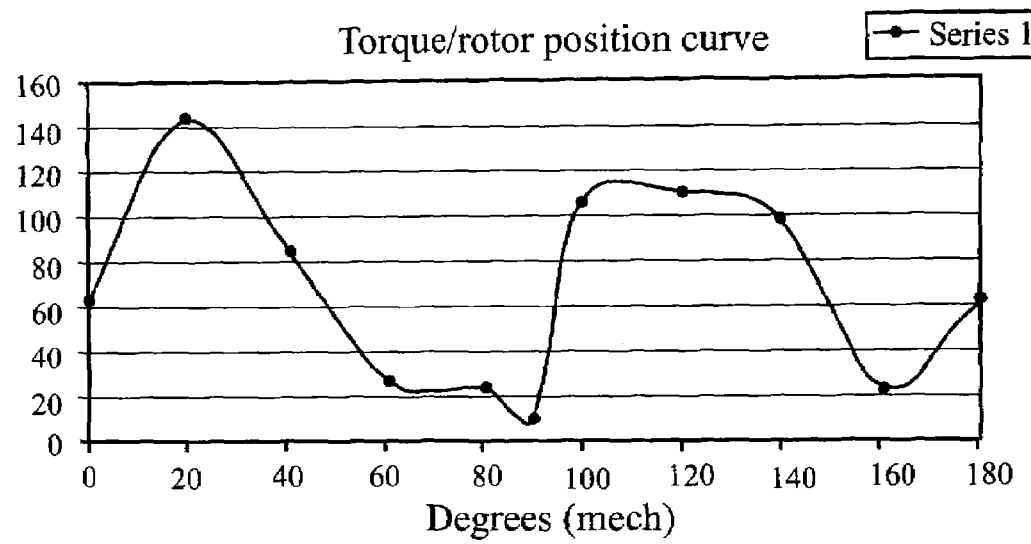
FIGS. 6a and b are torque curves for the motors of FIGS. 5 and 3 respectively.

In operation, the rotor 10 is rotating in the direction of the arrow A in FIG. 1a. That Figure shows the rotor 10 in the zero angle position. In this position there is excitation of the commutating coils 7 and a north pole is presented at the commutating pole 11. With reference also to the torque curve in FIG. 6a, it can be seen that, in the zero position there is a small positive torque. This is because the minimum reluctance position has not yet arrived but occurs at about 15°, at which point, the power to the windings 7,8 is turned off. The rotor is then drawn with high torque being applied by the magnetisation of the limb 12b of the back-iron 14. This torque is applied until -the minimum reluctance position of the rotor 10 within the confines of the back-iron 14 is achieved at about 100°, as shown in FIG. 1c.

However, at about 90°, ie before the minimum reluctance position is reached, the windings 7,8 are re-energised and a positive torque is applied as the pole 10b is attracted by the strong field produced by the commutating and field coils 7,8. Torque therefore continues to be applied to the rotor until beyond the 180° position, which corresponds with the zero position of FIG. 1a. The cycle thereafter repeats each 180 mechanical degrees.

However, between about 135° and 180°, the developing flux of the magnetic field (see dashed arrows in FIG. 1d) caused by the excitation of the commutating and field-connecting coils 7,8 interacts with the closed-circuit flux loop (solid arrows) caused by the magnetisation of the inner back iron. See the opposite directions of the flux lines in the limb 12c of the back-iron 14. Thus, while the closed loop exists, it reduces the torque developed by the commutated magnetic flux. Hence the drop in torque seen at about 160° in FIG. 6a. Nevertheless, there is a dual effect taking place. On the one hand, the pole 10b progressively "pinches-off" the air gap across which the closed loop flux crosses, so that the negative effect of the closed loop reduces. On the other hand, the pole 10b progressively connects with the commutating pole 11, so that the commutated flux leaving pole 10a and opposing the closed loop flux in limb 12c, increases.

In any event, the effect of the enlarged field pole 12 producing an inner back-iron 14 is that, not only does the rotor park (in either of the FIG. 1c or 1d positions) in a position at which it will start when power is first applied, but also it encourages combining of the fields produced by each source. The effect of this seems to be that the current impulse to force the rotor to deflect from its low reluctance position (ie FIG. 1d) need not be as large as required in the prior art arrangements shown in FIGS. A to D or exemplified by EP-A-455578 where the field produced are orthogonal. The power delivery to the rotor is also smoothed, reducing the need for inertial or other smoothing.

It should be emphasised that the motor described above, while showing many of the facets of the present invention, is not in within the scope of the invention.

Turning to FIGS. 2a to d, a variation on the FIG. 1 motor is shown, which is in accordance with the present invention, in that the rotor 10' is magnetised, whereas the field pole limbs 12a,b are not. Otherwise this embodiment is identical with FIG. 1, although the driving causes are different.

Figure 2A:
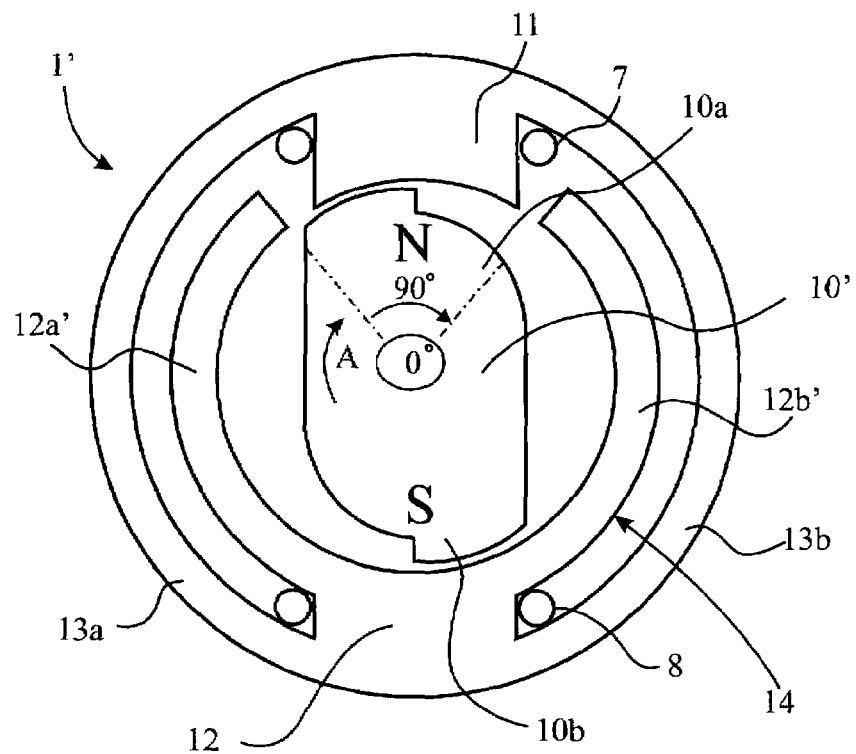
FIGS. 2a to d are the same as FIGS. 1a to d, except here the motor is in accordance with the invention because the rotor is permanently magnetised.
Figure 2B:
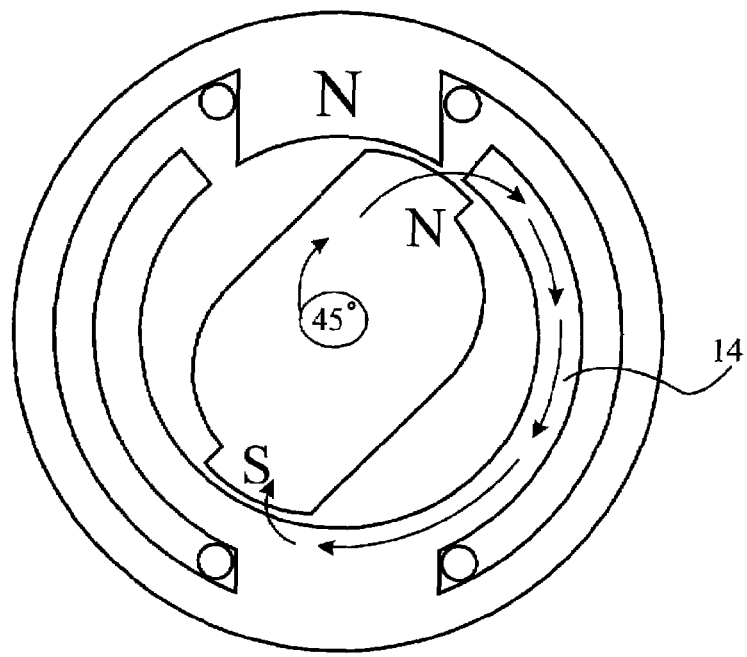
Figure 2C:
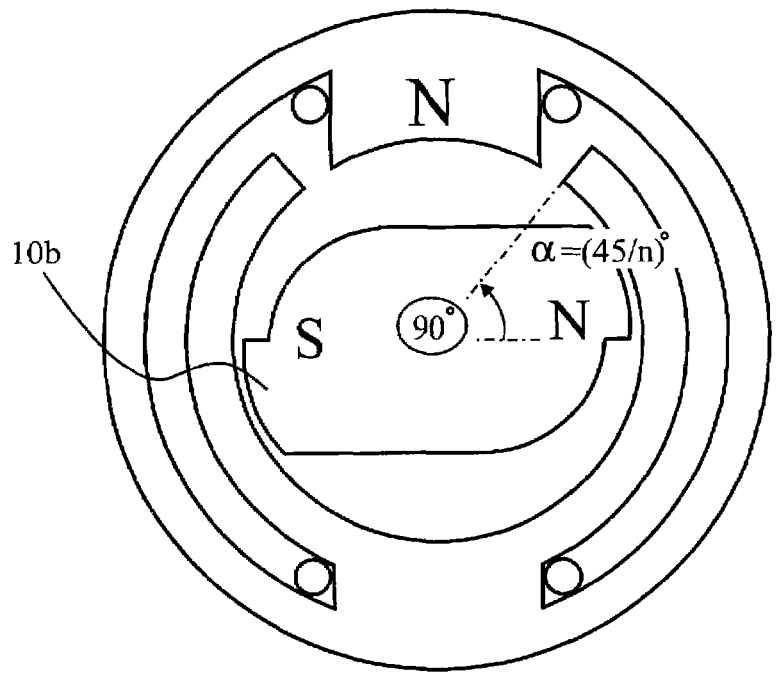
Figure 2D:
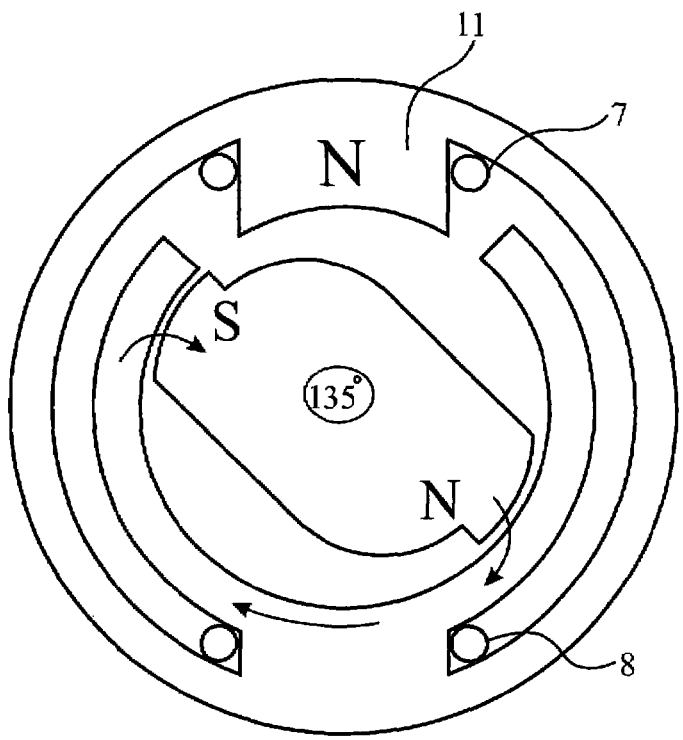

For example, about 10° after the zero position shown in FIG. 2a, the commutating windings 7 (and field-connecting windings 8) are energised to create a north pole at commutating pole 11. This repels the rotor 10' in the direction of rotation (Arrow A). At about 45°, a reluctance effect in the developing magnetic short-circuit through the inner back-iron 14 produces further driving torque (beyond what it would have been without it as shown in phantom lines in FIG. 6). This diminishes at about 90°, however, when the short-circuit is complete. On the other hand, at this point, the south pole 10*b* of the rotor 10' is now attracted by the north commutating pole, which attraction increases between 135° and 190°. Such increase would normally also increase the torque felt by the rotor (dashed line in FIG. 6) except that, at this phase, the low reluctance effect of the magnetic short-circuit (arrows, FIG. 2*d*) is being broken. At about 190°, the current through the field windings 7,8 is reversed to present a south pole at the commutating pole 11. Thereafter, the cycle is repeated in reverse but leading to the same shape of torque curve.

Figure 6B:
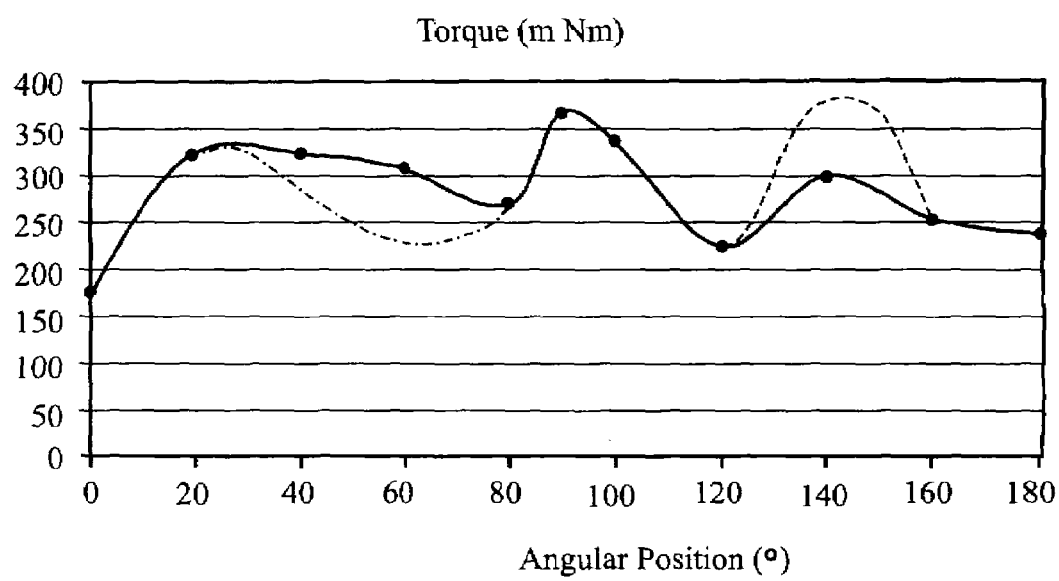

As can be seen from the upper curve in FIG. 6, there is some smoothing of the torque applied to the rotor.

Figure 3A:
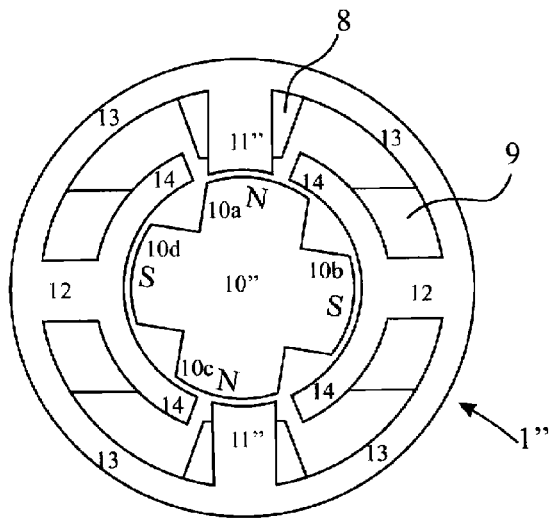
FIGS. 3a to c are similar views of a further embodiment of the present invention in which a four-pole rotor is employed having alternate permanent magnetisation of its poles.
Figure 3B:
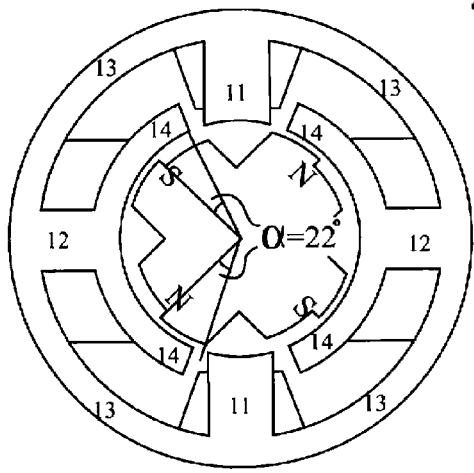
Figure 3C:
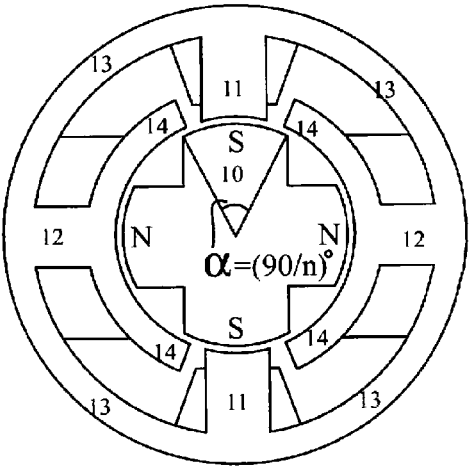
Figure 4:
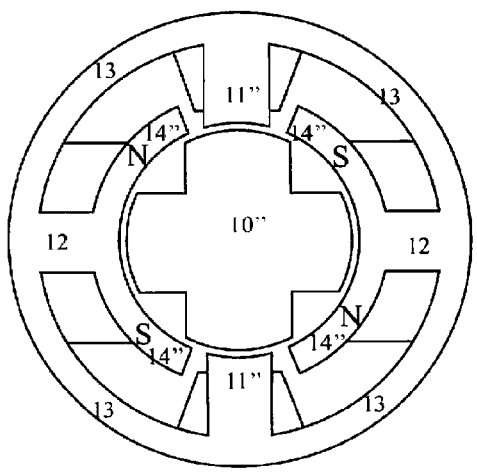
FIG. 4 is a similar view to FIG. 3c, except that here, like FIGS. 1a to d, the rotor is not magnetised, permanent magnetisation being incorporated in the stator.

Although the present invention works, in principle, with a two-pole rotor, the arrangements shown in FIGS. 3 and 4 are preferred because, over 180° of mechanical rotation twice as many peaks and troughs in the torque curve are experienced. For the same inertial mass of rotor, this will lead to smoother rotation, despite the fact that the electrical circuit required is the same.

In FIG. 3*a*, a four-pole rotor 10" is in the form of a cross and is magnetised to present alternating north and south poles 10*a*,*b*,*c* and *d* around the cross. Each pole is stepped or curved (not shown, except in FIG. 3*b*), as in the embodiments of FIGS. 1 and 2, to present a variable air gap for rotation direction control.

When the coils are energised in the FIG. 3*a* position, each commutating pole 11" presents a north magnetic pole to the north poles of the rotor 10". This 10 repels the two north poles 10*a*,*c* of the rotor and so the rotor moves clockwise. The inner iron ring 14 now starts to provide a low reluctance path between the north and south pole pairs 10*a*,*b* and 10*c*,*d* of the rotor 10".

The rotor rotates to a position of minimum reluctance, a few degrees clockwise beyond the position shown in FIG. 3*b*. This will naturally occur with or without energisation from the stator windings. When the rotor is at the position shown in FIG. 3*b* the stator coils are energised (if not already—that is to say, if turned off for a period between the FIGS. 3*a* and *b* positions) so that a north pole is present at the airgap surface of commutating poles, 11. Now the south poles of the rotor are attracted to the commutating poles. The method of torque production at this step is by a combination of electromagnetic alignment torque and reluctance torque.

With the rotor in the position as shown in FIG. 3*c*, the current in the stator windings is reversed as quickly as possible. This impulse in the magnetic field 'kicks' the south poles of the rotor by applying an opposing field and thus pushes the rotor again with a clockwise rotation. The process is repeated for every 90 degrees of rotation, but each time the directions of current are reversed. As with the previously discussed embodiments, one electrical cycle may be seen to occur every 180° of mechanical rotation. The reversal of the field in the commutating poles may describe this machine as a reciprocating flux impulse motor.

A simpler version of the motor (not in accordance with the invention) is shown in FIG. 4, where the field in the commutating poles and back iron is unidirectional (ie, it does not reverse), and the inner iron ring 14" possesses a magnetisation as shown. This arrangement corresponds with the FIG. 1*a* to *d* embodiment of the present invention. Here the inner iron has a four-pole magnetisation to attract the four-poles of the rotor when at rest.

Figure 5:
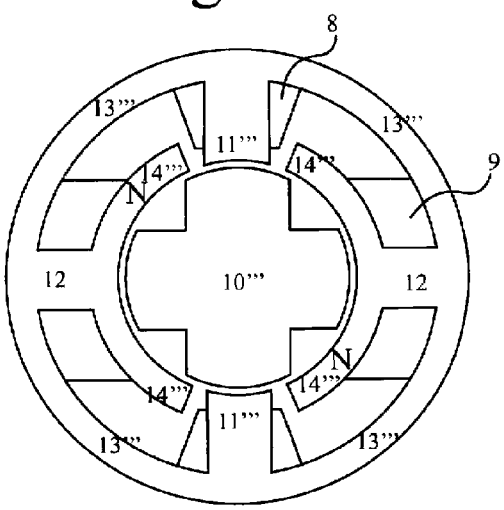
FIG. 5 is a view similar to FIG. 4 of a simpler motor.

Also, for a four-pole rotor, a two-pole magnetisation may also be applicable as shown in FIG. 5. However, with this arrangement, the permanent field in the inner iron 14''' will be shared with the back iron 13'''.

When current is applied to the coils 8,9, the commutating poles will attract the poles of the rotor. The direction of current is important as this will enhance the permanent field in the inner iron or try to oppose it and may affect the torque production mechanism at commutation. However, if sufficient ampere-turns is applied, the commutating poles will attract the nearest rotor poles and (mostly) reluctance torque will be produced. As there is a variable air gap between the commutating poles 11''' and the rotor poles 10''', the commutating poles will pull the rotor to a position similar to that shown in FIG. 3*a*.

Upon releasing the current, the rotor will continue to rotate clockwise due to the permanent magnetisation of the inner iron. As there is no permanent magnetisation of the rotor 10''', the commuting current may be unidirectional. This applies also to the FIG. 4 arrangement.

Figure 7A:
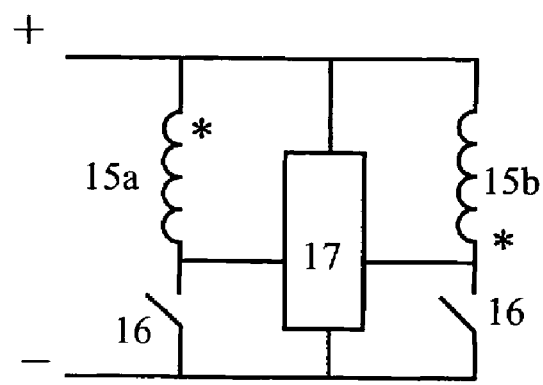
FIGS. 7a and b are different circuit arrangements for powering the motors of FIGS. 2 and 3.
Figure 7B:
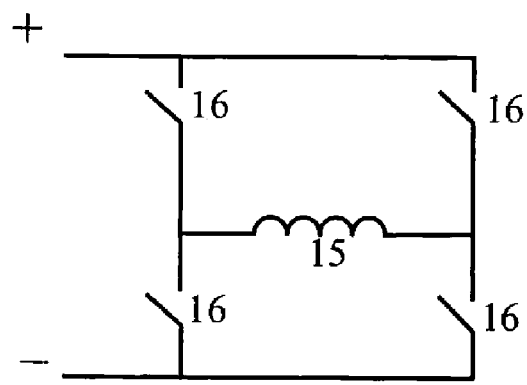

Typical electrical drive circuits for the reciprocating flux impulse motor (ie the embodiments of FIGS. 2 and 3) are shown in FIG. 7. FIG. 7*a* shows an arrangement using two transistor switches 16, allowing a bi-directional field to be produced using a bifilar winding 15*a*,*b* for the commutating and field coils 8,9 respectively. Alternatively, a bi-directional field may be produced using an H-bridge arrangement shown in FIG. 7*b*.

For the reciprocating flux impulse motor to function satisfactorily the rapid reversal of the flux is important. This can be achieved by the circuit in FIG. 7*a* which employs a snubber arrangement 17 to controllably allow the turn-off voltage across the switch 16 to rise to a maximum voltage. Thus this large voltage opposes the inductive current in the winding and so rapidly forcing it to zero. Simultaneously turning on the other switch allows the field to build up in the other direction. The stored energy absorbed during the turn-off of the first switch may be used to forcibly and rapidly increase (or 'kick-start') the current in the other winding, rather than simply allowing the current to steadily build up with a normal supply voltage. This is because the stored energy can be arranged to be at a much higher voltage than the voltage of the power supply.

Alternatively, the stored energy in the snubber 17 can just be returned to the supply, rather than being dissipated in a resistance. In either case the snubber circuit is said to be regenerative, where the recovered energy is not lost, and is, therefore, more efficient than a conventional RCD (resistor-capacitor-diode) snubber.

Figure 8:
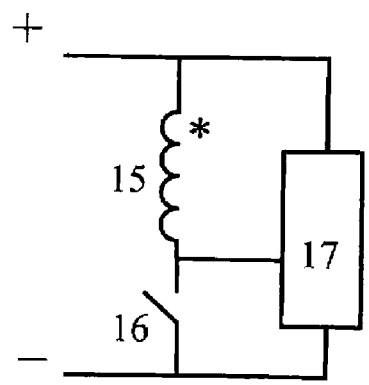
FIG. 8 is a circuit arrangement for powering the motors of FIGS. 1, 4 and 5.

A typical circuit for the simple (unidirectional) flux impulse motor of FIGS. 1, 4 and 5, is shown in FIG. 8 using only a single winding, 15, a single switch, 16, and a snubber circuit that may be regenerative.

In both types of motor the firing of the drive circuit is synchronised to the rotor position relative to the stator by a suitable encoder. On the other hand, it is envisaged that sensorless techniques may be used to achieve the same objective.

Figure 9A:
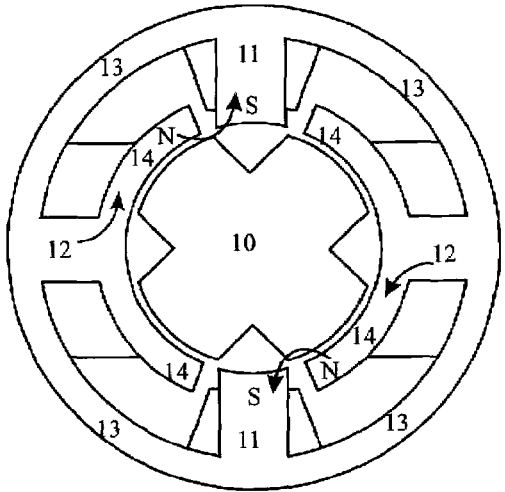
FIGS. 9a to c show the flux distribution of the motor of FIG. 5 when a south pole is formed at the commutating poles.
Figure 9B:
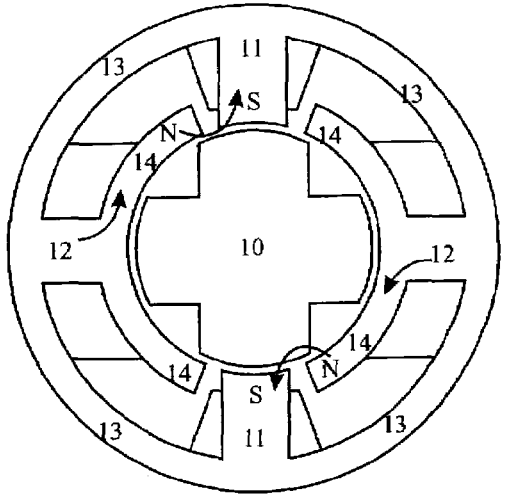
Figure 9C:
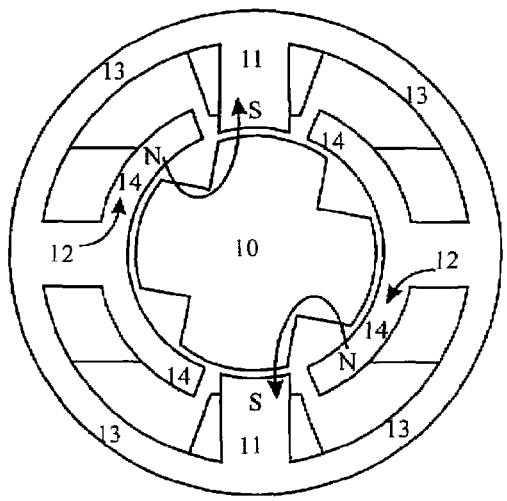
Figure 10:
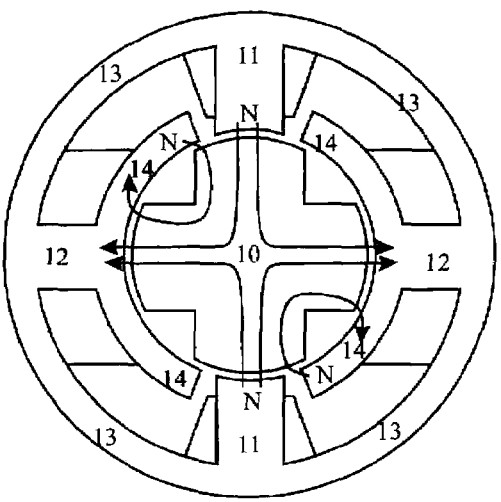
FIG. 10 shows the flux distribution of the motor of FIG. 5 when a north pole is formed at the commutating poles.

Turning finally to FIGS. 9 and 10, the unidirectional flux impulse motor (not in accordance with the present invention) has parking magnets (N) in the inner iron of the stator, as shown in FIG. 9*a*. When commutation is about to take place, the direction of the magnetic field in the commutating poles 11 affects the torque producing mechanism of the rotor. If the parking magnets presents 'north' poles into the airgap of the motor and the direction of the current in the coils allows the commutating poles to be 'south' poles at the airgap then the magnetic flux path in the motor is shown in FIG. 9*a*. It can be seen that the field due to the magnets and the field due to the commutating poles are coincident and the net attractive force on two of the rotor poles is great. The rotor is forced to move to a position as shown in FIG. 9b. At this point the other two neighbouring poles of the rotor are approaching the vicinity of the parking magnets. Instead of the rotor stopping at the position shown in FIG. 9b, the magnetic field finds a new (lower reluctance) path via the neighbouring poles, see FIG. 9c. Motoring torque is maintained in the situation of FIG. 9c, where the neighbouring poles of the rotor are being pulled into alignment with the combined field passing through the magnets.

If, however, the current in the coils is in the reverse direction, such that the commutating poles presented 'north' magnetic poles to the airgap (like the magnets) then the magnetic fields due to the magnets and the stator excitation will not be coincident. Instead, they will seek independent paths throughout the iron of the motor, see FIG. 10. This situation does not effectively and efficiently commutate the motor and may result in stalling the machine. This arrangement should therefore be avoided.

The flux impulse motor of the present invention may typically operate as a variable speed drive utilising one or two power transistors to commutate the current in the commutating winding. Other arrangements are possible using more than two transistors including the possibility to commutate the field winding current, but this adds complexity and cost to the drive. The speed of the machine is controlled by either varying the magnitude or duration (or both) of the current in the commuting winding (and possibly the field winding). The effect is to control the magnitude of they torque producing impulse of flux at the commutating poles. The magnitude of the current is varied by chopping the current (usually at some high frequency). This may cause starting problems though, so phase angle control of the current is an alternative (if not a preferred) option. Phase angle control operates by introducing a variable delay at turn-on of the current in the commutating winding. This delay is typically zero at start-up and is increased to achieve the desired operating speed. This may be achieved by utilising some form of closed loop feedback control system.

The invention claimed is:

1. A motor comprising:
   a) a stator;
   b) a rotor mounted for rotation in the stator;
   c) first and second poles of the stator;
   d) a winding on at least on of the stator poles;
   e) at least one pair of salient poles of the rotor;
   f) an outer back-iron magnetically joining said stator poles;
   g) an inner back-iron, extending from at least one of said second stator poles around the rotor so that the magnetic field in the rotor between adjacent poles of the rotor is substantially short-circuited by said inner back-iron for a part of the rotation of the rotor;
   h) an electrical circuit to power the winding to drivingly rotate the rotor; wherein
   i) the first pole of the stator is a commutating pole having said winding and never substantially short-circuiting the magnetic field through adjacent rotor poles;
   j) said second pole of the stator is a field connecting pole provided with said inner back iron;
   k) the rotor is magnetised so that adjacent ones of said rotor poles are oppositely magnetised;
   l) said electrical circuit is provided with a controller to produce an alternating magnetic field in the commutating pole of the stator to attract each pole of the rotor as it approaches the commutating pole and to repel each pole of the rotor as it moves away from the commutating pole, said field alternating as many times per revolution of the rotor as there are poles of the rotor; whereby
   m) the rotor is driven by a combination of electromagnetic torque through interaction between the rotor and the commutating pole and reluctance torque through interaction between the rotor and the field-connecting pole.

2. A motor as claimed in claim 1, in which the angular extent of adjacent poles of the rotor is about the same as the angular extent of the inner back-iron, which angular extent is about $(270/n)°$, where n is the number of rotor pole pairs.

3. A motor as claimed in claim 1, in which the angular extent of one of said poles of the rotor is about the same as the angular extent of the commutating pole.

4. The motor of claim 3, wherein the angular extent of the commutating pole is about $(90/n)°$, where n is the number of rotor pole pairs.

5. A motor as claimed in claim 1, in which said poles of the rotor have a varying radius across their angular extent such that said poles are short-circuited over an angle α equal to about $(45/n)°$, where n is the number of rotor pole pairs.

6. A motor as claimed in claim 5, in which there are two field-connecting poles, two commutating poles and a cross shaped rotor having two pole pairs and in which the angle α is 22°.

7. A motor as claimed in claim 1, in which there are an equal plurality each of commutating and field-connecting poles alternately disposed around the stator, and twice as many poles of the rotor as there are field-connecting poles.

8. A motor as claimed in claim 7, in which there are two field-connecting poles, two commutating poles and a cross shaped rotor having two pole pairs.

9. A motor as claimed in claim 1, in which said poles of the stator are salient.

10. A motor as claimed in claim 1, in which said commutating pole winding is around the commutating pole of the stator.

11. A motor as claimed in claim 10, further comprising a field winding around the field-connecting pole and in which said commutating and field windings are in series.

12. A motor as claimed in claim 11, in which the field winding develops a larger magnetic field than the commutating winding.

13. A motor as claimed in claim 1, further comprising a field winding around the field-connecting pole.

* * * * *